Figure 1:
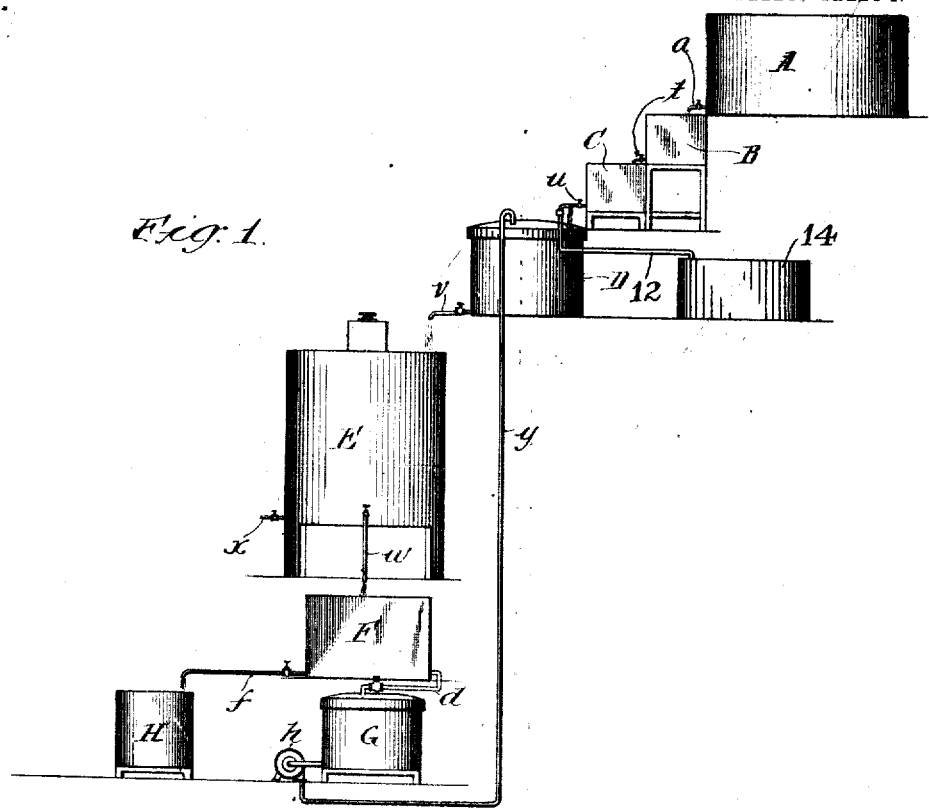

H. S. MacKAY.
PROCESS FOR EXTRACTING METALS FROM THEIR ORES.
APPLICATION FILED JAN. 20, 1910.

1,011,459.

Patented Dec. 12, 1911.

4 SHEETS—SHEET 1.

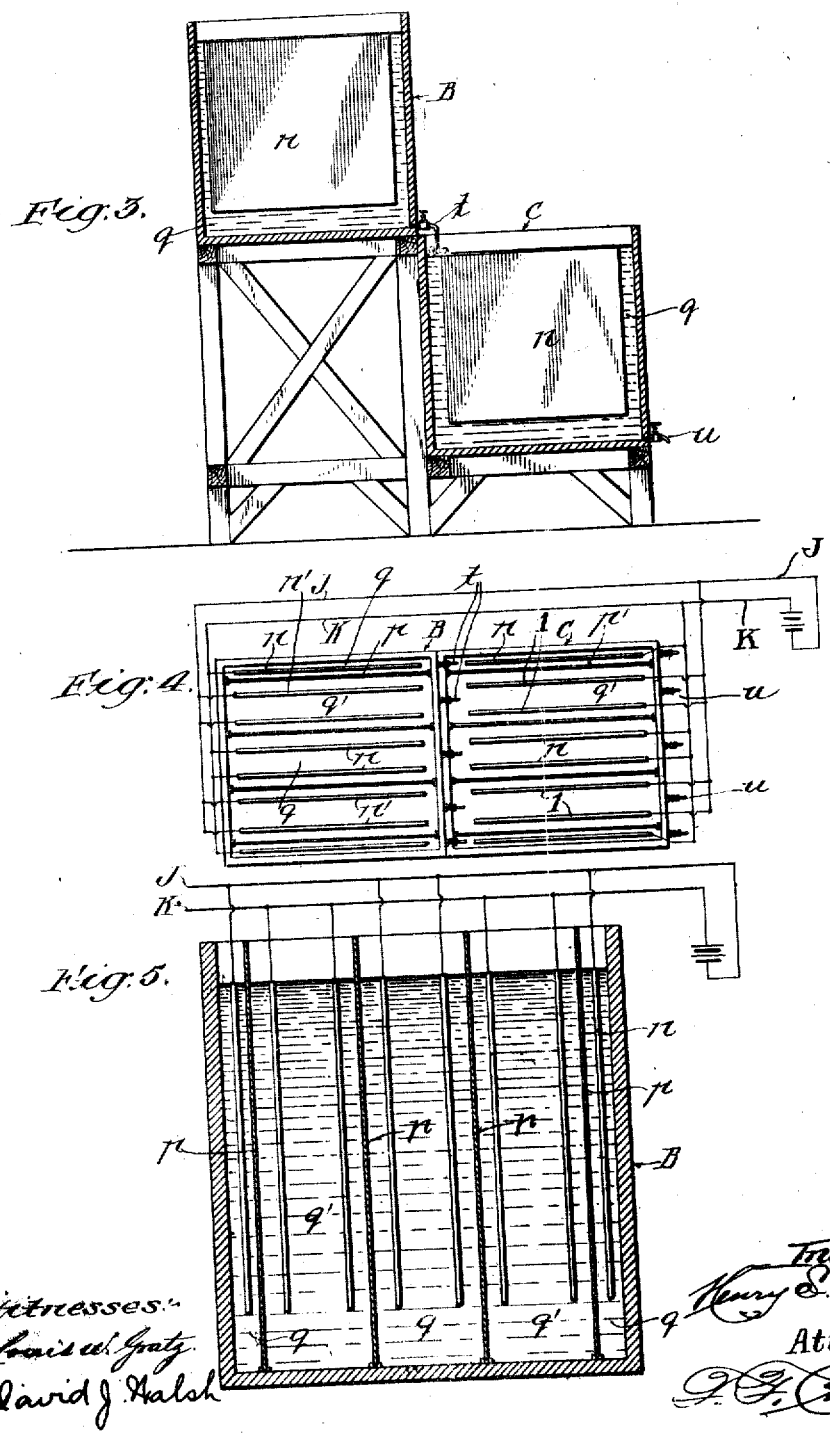

H. S. MacKAY.
PROCESS FOR EXTRACTING METALS FROM THEIR ORES.
APPLICATION FILED JAN. 20, 1910.

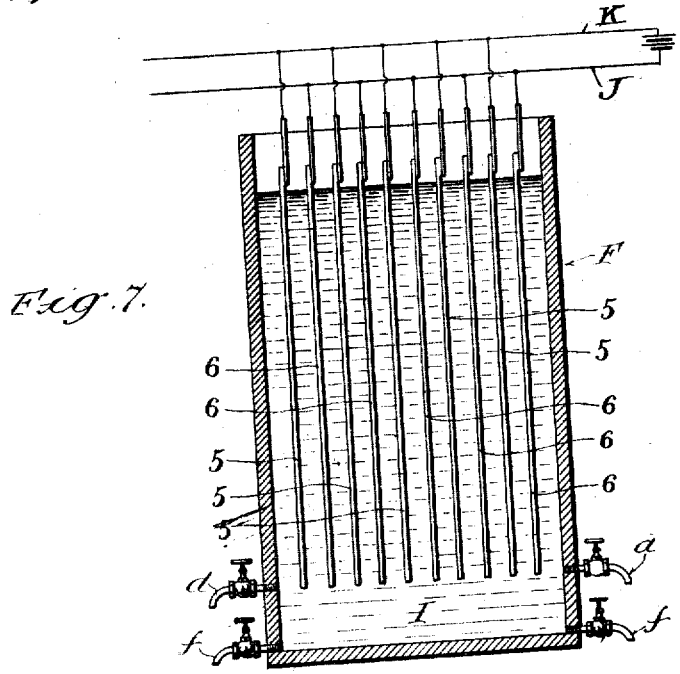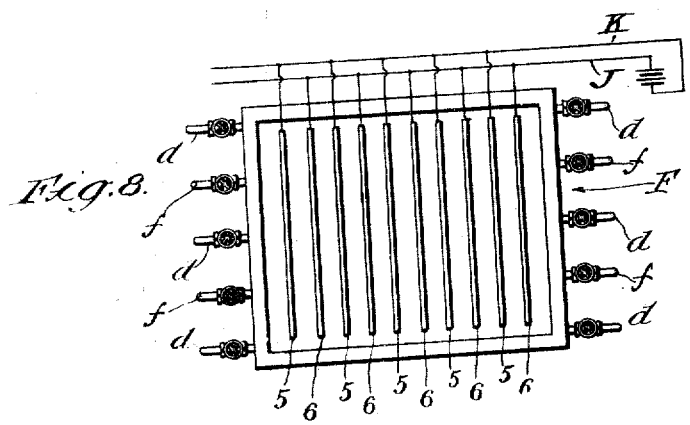

UNITED STATES PATENT OFFICE.

HENRY S. MACKAY, OF RIVERSIDE, CALIFORNIA, ASSIGNOR TO MACKAY COPPER PROCESS COMPANY, OF RIVERSIDE, CALIFORNIA, A CORPORATION OF ARIZONA TERRITORY.

PROCESS FOR EXTRACTING METALS FROM THEIR ORES.

1,011,459.  Specification of Letters Patent.  Patented Dec. 12, 1911.

Application filed January 20, 1910. Serial No. 538,960.

*To all whom it may concern:*

Be it known that I, HENRY S. MACKAY, a citizen of the United States, and a resident of Riverside, California, have invented a certain new and useful Improvement in Processes for Extracting Metals from Their Ores, of which the following is a specification.

My invention relates to processes for extracting metals from their ores.

The object of the invention primarily is to produce a means for economically extracting metals from their ores.

In the manipulation of the process certain effective agents are produced. The agents or elements or compounds combine with the metal of the ore and subsequently they may be liberated and used again and with substantially the same chemical strength as when first used. The metal may be removed from the ore by means of a solution containing the active agent or agents and then the agent or agents may be separated chemically from the metal and at the same time they may be liberated into the solution in an active relationship or condition. The solution may thus be revived to its former chemical strength. Also if desired the metal may be removed from the revived solution immediately upon its separation from the active agent or elements.

In the accomplishment of the preferred form of the invention or the preferred method involving the use of the invention one or more active elements are produced in a solution and brought into contact with the ore. The ore is thoroughly treated with the solution giving the agents an opportunity to attack the metal of the ore and produce a soluble salt. The valuable metal is then removed from the solution formed after the agents have chemically united with the metals of the ore. The solution is revived by freeing the agents from the desired metal into the solution which restores the solution to its solvent power. At the same time that the solution is revived the metal is removed from the part of the solution containing the regenerated or newly freed agents, to a non-active solution or a non-active or saturated or satisfied portion of the solution. This prevents subsequent action of the agents on the metal. Successive charges of the ore are thus treated by the constantly revived solution.

For the purpose of illustrating the application of my invention and to show that it is practical I shall describe a process involving the use of the invention for the extraction of copper from its ore. I shall also describe a means for carrying out the process.

The process may be greatly modified and used for the extraction of many metals and yet such modifications of the process will still contain the essence of the invention.

Figure 2:
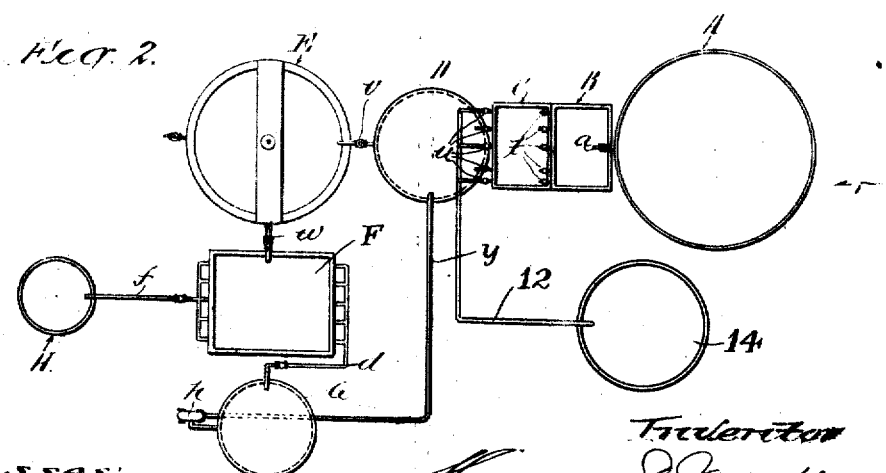
Figure 6:
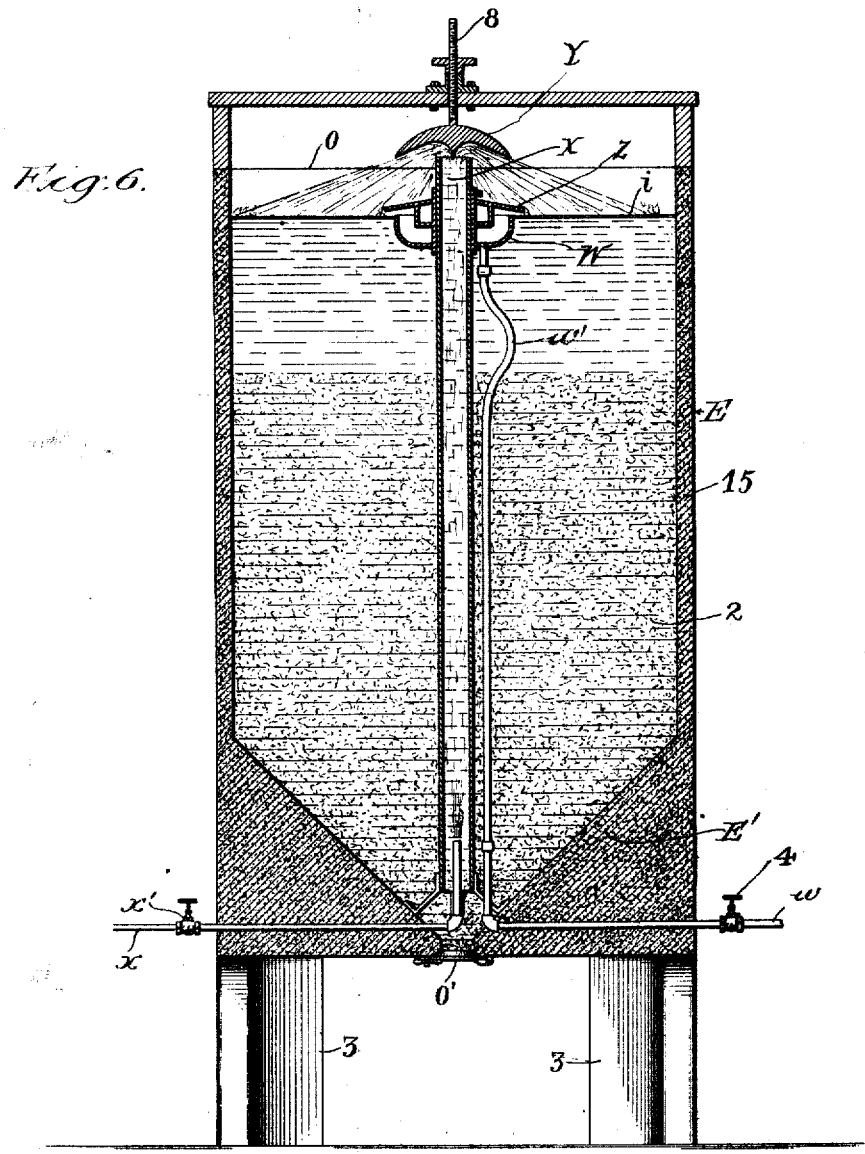

Referring to the drawings, Figure 1 illustrates a side view of one form of apparatus that may be used in carrying out the process which I am about to describe. Fig. 2 illustrates a top view of such an apparatus. Fig. 3 illustrates a side sectional view of two electrolytic vats. Fig. 4 illustrates a top view of the vats. Fig. 5 illustrates an end sectional view of one of the vats. Fig. 6 illustrates a mixer used in connection with the apparatus. Figs. 7 and 8 illustrate side sectional and top views of another electrolytic vat.

Referring to Figs. 1 and 2. A is a reservoir for containing a solution of a salt of an alkaline metal which is used in the production of the active agents. B and C are the electrolytic vats for treating the solution. In B the solution received from A is treated and in C the solution received from B is likewise treated. D is a reservoir which receives the prepared solvent from the vats. E is an agitator in which the charges of the ore are placed and then treated with the solution prepared in the vats B and C or with the revived solution formed after the charges of the ore have been leached. F is an electrolytic vat in which the metal is removed from the solution received from the tank E. At the same time that the metal is taken from the solution the solution is revived so that it can be used again for the extraction of metal from the ore. G is a reservoir which receives the regenerated solution from the electrolytic vat F. h is a suitable pump which transfers the revived solution from tank G to tank D. a is a pipe used to convey a solution from the reservoir A to the electrolytic vat B. t are pipes used to convey solution from vat B to vat C. u are pipes used to convey solution from vat C to the tank D. $v$ is a pipe used to convey solution from tank D to the mixer E. $w$ is a pipe used for conveying solution from the agitator to the electrolytic vat F. $d$ is a pipe used for conveying solution from the vat F to the tank G. $f$ is a pipe or launder used to convey the copper precipitated in the electrolytic vat F to the tank H and $y$ is a pipe through which the regenerated solution is discharged from the tank G into the tank D. 12 is a pipe which conducts a solution formed in vat C to a tank 14.

The solution for treating the ore may be prepared by forming an aqueous solution of a salt, such as common salt (sodium chlorid) in the tank A. This solution may be prepared by either dissolving the salt in water or by evaporating sea water until the water carries the proper percentage of sodium chlorid. Some natural waters, such as the salt water from the Salt Lake of Utah, may be used without addition or removal of salt. The aqueous solution of sodium chlorid is directed into the electrolytic vat B, shown in Figs. 4 and 5, until it is filled. The vat B is provided with diaphragms $p$ $p'$ made of suitable porous material that will allow electrolytic action in the vat. The diaphragms form cells or compartments in which the electrodes are placed. The cathodes are placed in one set of cells and the anodes are placed in another set of cells. The cells having the cathodes alternate with the cells having the anodes, a pair of cathodes or a pair of anodes being placed in each cell, except in the first and the last cells, in which single anodes or cathodes are placed.

$n$ are the cathodes and $n'$ are the anodes. The anodes $n'$ may be formed of a metal which will in the process react or coöperate with the solution to produce the active agents which extract the desired metal from the ore. In this particular process the anode is made of iron. The cathodes $n$ may be made of an insoluble material.

K and J are electric conductors which carry a current of electricity to and from the electrodes $n$ and $n'$. K is a conductor which is connected with the cathodes $n$. J is a conductor which is connected with the anodes $n'$, the anodes and cathodes being connected in parallel. The current passes into the electrolytic vats through the conductor J to the anodes $n'$ and through the solution surrounding them and the diaphragms $p$ and $p'$ to the cathodes $n$ and to the conductor K and back to the generator.

Passing an electric current through the solution of sodium chlorid in the presence of iron or similar material results in the decomposition of the sodium chlorid and dissolution of the metal of the anode. The sodium of the salt and hydrogen of the water are liberated at the cathodes. They are deposited or liberated in the solution of the cells containing the cathodes while chlorin and oxygen are liberated in the solution about the anodes. Chlorids of the anode metal are thereby formed and some free chlorin remains in the solution about the anodes. The result of the chemical reaction and electrolysis will be the formation of ferrous and ferric chlorids by some of the chlorin combining with the iron. If the current is continued for a sufficient length of time all the chlorin contained in the solution will pass to that part of the solution surrounding the metallic anodes. The sodium is deposited in the compartments which contain the cathodes and it there decomposes the water of the solution and forms caustic soda. The iron dissolved in the anode solution, being an electronegative element, is partly transferred to the cathodes but as fast as it is transferred, it is precipitated in the compartments of the cathodes by the caustic soda formed in the cathode solution and falls to the bottom of the compartment. But as the iron of the anode dissolves faster than it can be deposited at the cathodes, the surplus chlorid of iron is retained in the anode compartments. After sufficient chlorin and chlorids of iron for the required purposes are formed in the anode compartments the current is turned off and the solution is allowed to flow into another electrolytic vat C. The vat C is constructed the same as vat B and the solution of the compartments containing the anodes of vat B is directed into the compartments containing the anodes of the vat C. The same is true of the solution contained in the compartments of vat B in which the cathodes are located which is directed into the corresponding compartments of vat C. The anode compartments of vat C thus receive the ferrous and ferric chlorids and free chlorin in solution while the cathode compartments receive part of the original sodium chlorid solution and some caustic soda in solution. The object in changing the solution from one vat to the other is to convert all the chlorid in the anode divisions from the lower chlorid to the higher, in this case to ferric chlorid and produce free chlorin but this object can be obtained by inserting insoluble anodes in place of the soluble anodes instead of changing the solution as above described. Furthermore the solution may flow continuously from one vat to the other while the electrolysis is going on, the fluids being at the same time removed from the second vat. The solution about the cathodes $n$ in the vat B is directed into the compartments containing the cathodes $n$ of the vat C and the solution about the metallic anodes $n'$ is directed into the compartments about the insoluble anodes 1 in vat C. After the solution, or the anodes, has been changed and the electric current has been turned on, the current will pass from the insoluble anodes 1 through the porous diaphragms and the solution to the cathodes $n$ and then back to the generator. In the course of the electrolysis sodium and hydrogen are deposited at the cathodes and chlorin and oxygen at the anodes. Part of the chlorin and the hydrogen which collects at the top of the plates may, if desired, be united to form hydrochloric acid. Also some sodium chlorate is formed by the action of the chlorin. The ferrous chlorid formed in vat B is changed into ferric chlorid. When all the ferrous chlorid is converted into ferric chlorid the preparation of the solvent is finished. The anode compartments then contain ferric chlorid and free chlorin in the solution and if the vat is covered or sufficient light is given, they will also contain hydrochloric acid. The solution from the anode compartments $q$, $q'$ is then directed into the tank D and the solution of the cathode compartments is directed into a separate tank 14. When a sufficient quantity of a solvent is prepared the ore is treated with it. The ore is placed in an agitator E. The ore is pulverized and the tank is partly filled therewith. The solution is drawn from the reservoir D and directed into the tank E until the ore is submerged. One part of the solution by weight to one part ore to two parts solution to one part ore is used as may be desired varying the proportions according to the fineness to which the ore is crushed and the texture and character of the rock.

Fig. 6 illustrates quite in detail the construction of one form of agitator. 15 is the wall of the tank which may be made of any non-metallic substance, which will not be acted upon by the acids of the solution used in leaching the ore. E' is a filling which forms a conical bottom for the inside of the tank. X is a central tube. W is a movable float surrounding and adapted to move along the central tube X. The float is cup-shape and is adapted to decant the clear solution from the ore as needed. A cover Z is located a short distance above the float and is adapted to protect it from the spray formed at the top of the tube X. $x$ is an air pipe connected with a reservoir or pump having air under pressure. The air pipe extends up a short distance into and along the axis of the central tube X. It is provided with the valve $x'$. Y is a deflector located above the tube X, which may be adjusted by screw 8, with respect to the central tube. The deflector causes the mechanically mixed ore and solution rising in the central tube to spread or spray over the top of the surface of the contents of the tank E. 2 is the mixture of the ore and solution in the tank. $i$ is the top of the solution which covers the ore. $o$ is the top of the tank. $o'$ is a discharge gate at the bottom of the tank. 3 are supports for the tank which hold it above the flooring so as to leave a clear space in order that the tailings may be conveyed away from underneath the gate $o'$.

After the ore and solution have been placed in the agitator E, air under pressure passes in at the pipe $x$ and up the tube X forcing with it the crushed ore and solution which enters the central tube at its lower end. The mixture comes in contact with the deflector Y and is thrown to the outer walls of the tank. The lower end of the tube X is placed at the center of the conical bottom of the tank and as the mixture settles it is drawn in at the bottom of the tube X and carried upward to the deflector from whence it is returned down the sides of the tank making a continuous operation as long as air under pressure is passed through the pipe $x$. The ore in the tank is thus thoroughly leached with the solution. It is often necessary to agitate the ore while leaching it and it is preferable to do so to save time but the solvent under certain conditions will dissolve the copper from the ore without agitation. When the ore is leached in the solution for a sufficient time to allow the ferric chlorid and the chlorin and the chlorin acids, that is, the active elements in the solution, to form chlorids of the metals in the ore, the solution is drawn off and a new solution added if necessary until all the copper is reduced to a chlorid. The solution is drawn off by decanting the clear solution from the top of the tank, but other methods can be used to accomplish the same result.

In Fig. 6 the float W, which is connected to the tube $w'$ will maintain itself on the surface of the solution. In order to decant the solution the air current is stopped by the valve $x'$ and the ore is allowed to settle. The valve 4 is then opened and the solution flows down from the surface in the agitator through the tube $w'$ and through the valve 4 and pipe $w$ which leads to the electrolytic vat F.

In the leaching process, if the ore contains copper and another metal, and if an anode of the other metal is used in the preparation of the solvent such as iron, etc., the solution carrying potentially active chlorin elements, such as the higher chlorid of the said other metal such as ferric chlorid and free chlorin, and chlorin acids such as hydrochloric acid and sodium chlorate, give up a part of the chlorin. In the process just described which is illustrative of one form of the invention, the ferric chlorid is reduced to ferrous chlorid, some of its chlorin being liberated, and the free chlorin thus liberated and the chlorin in the solution and the acids attack the copper and form cuprous and cupric chlorids. If the cupric chlorid in solution is allowed to remain in contact with the ore, it will in turn attack the copper of the ore and form cuprous chlorid thereby taking out an additional amount of the copper from the ore. When the chlorids of the metals of the ore are formed the solution is drawn off and the charge of ore may be again treated with another charge of the solution containing the elements in active relationship unless all of the copper is removed from the ore. Until this occurs the ore is leached with charges of the solution. When the copper is removed another charge of the ore is treated with the solution. The solution drawn off from the ore is directed into the electrolytic vat F and the copper is removed by electrolysis. It may be separated from the solution on the cathode either in the form of copper plate or as spongy copper in a powder condition, according to the strength of the current used. At the same time that the copper is separated from the solution the chlorin with which it was combined while in solution is restored to substantially its original potential chemical relationship in the solution. The ferrous chlorid is changed to ferric chlorid, free chlorin is restored to the solution and hydrochloric acid is formed if desired, the same as in the original solution. The revived solution is then pumped back into the tank D to be used over again. Some of the cuprous chlorid may still remain in the solution but it is sooner or later removed in the successive treatment of the solution in the precipitating vat F.

The vat F has walls made of any suitable material which will not be acted upon by the electrolyte, or the agents produced in the electrolysis.

5, 5 are the anodes which are made of an insoluble material.

6, 6 are the cathodes which may be made of either a soluble material or an insoluble material but are preferably made of an insoluble material.

J is the main conductor carrying the current to the anodes 5 and K is the return conductor which connects the cathodes 6 with the generator. The electrodes of the vat are thus connected in multiple. In the arrangement shown both sides of the cathodes and anodes are available the anodes and the cathodes being located alternately in making up the cell. The current passes in through each anode to the opposing cathodes located on opposite sides of the anode, except the first and last anode or cathode which have in each case but one opposing surface.

The vat F is so constructed that there is a space I between the bottom of the vat and the lower ends of the electrodes. This space is utilized for collecting the copper. The solution in the space I is not acted upon by the current and no active agents are formed therein. It thus remains neutral or nonactive. The copper precipitated at the cathodes is collected in this portion of the solution.

The result of the electrolysis in the vat F is that the copper in the solution, being more electronegative than iron, is deposited at the cathodes, and if the proper current density is used, hydrogen from the water will also be deposited with the copper at the cathodes and oxygen and chlorin will be collected at and in the vicinity of the anodes with the result that the copper is deposited in the form of powder at the cathodes which precipitates to the bottom of the vat. Part of the hydrogen may be combined to form hydrochloric acid while some of the free chlorin remains in the solution. The solution below the electrodes, however, remains unchanged. In this condition it is nonactive and it will not dissolve the copper. When the ferrous chlorid is converted to the ferric chlorid the current is turned off. It is found by practical working of the process that by continuing the current for a longer period the power of the solution to extract the copper from the ore is gradually destroyed for the chlorin will be gradually liberated at the anodes. When the ferrous chlorid is converted to the ferric chlorid as above described, it then contains free chlorin and active chlorin compounds and is in the best condition to be used over again as a solvent. The regenerated solution is then drawn through the pipes $d$, $d$ and returned to the tank D through the tank G and the pump $h$ and pipe $y$. It is again directed to the agitator E for another operation and the solution produced after leaching is again directed into the vat F and so on circuitously. When the solution about the electrodes is removed, the part in the bottom of the vat, that is, the portion more or less saturated with the salt of the metal obtained from the ore and which receives the copper is left in the bottom of the vat. When sufficient copper has accumulated in the vat F and in the solution below the electrodes and after the solution about the electrodes has been drawn off, the copper and the surrounding solution is drawn off through the pipe connections $f$, $f$ and directed to a storage tank or reservoir H where the copper settles to the bottom. The solution is drawn off and returned to the vat D and the copper is placed in a suitable furnace and melted into the refined copper bars of commerce.

In the many experiments and practical tests that I have made with this process it appears that the solvent produced is exceedingly efficient. However it is to be understood that I do not confine myself to the exact process or means specified herein for the production of the solution containing the active elements. A solvent may be prepared chemically by addition of the compounds and elements in the proper proportions which will have practically the same chemical activity when applied to copper ore carrying iron or other similar metals. The active chlorin attacks the copper and the iron of the ore and the solution may be revived upon the extraction of the copper contained in it as above described.

It is found after a long series of practical tests that the reactions that take place under the above conditions are substantially as specified, but whatever may be the reactions or whatever active agents may be produced in carrying out the process, the electrolytic reduction of copper from its ore, which has been selected for the purpose of illustration only, is accomplished by the steps described.

The invention may be modified by those skilled in the art to which it pertains without departing from the spirit thereof. The invention itself may be used in many chemical or electrolytic processes to accomplish many results, what I have described above being merely an illustrative process involving and containing the essence of the invention.

What I claim as new and desire to secure by Letters Patent is as follows:—

1. A process of producing a solvent for ores, which consists in decomposing a solution of a salt in contact with a soluble material and transferring the acid radical of the said salt from one part of the solution to another and electrolyzing the resultant solution formed after the transfer in contact with an insoluble electrode.

2. A process of treating ore which consists in electrolyzing a solution of sodium chlorid in contact with a soluble anode which will form a solvent for acting on the ore, electrolyzing the solution produced in the last mentioned step in contact with an insoluble anode, leaching the ore with the solution produced in the last mentioned step, reviving the solution by treatment of the elements in the solution produced in the last mentioned step and leaching the ore with the regenerated solution.

3. A process of extracting metal from its ore, which consists in electrolyzing a solution of a salt in contact with a soluble metal anode which will form a solvent for acting on the ore and then in contact with an insoluble anode, leaching the ore with the resultant solution, reviving the solution produced by the said leaching from the elements of the solution by electrolyzing the solution.

4. A process of extracting metal from ore, which consists in electrolyzing a solution of sodium chlorid in contact with a metal anode which will form a solvent for acting on the ore, dissolving the anode metal in the solution and forming a solution of a lower chlorid of the metal and forming a chlorin agent, leaching the said ore with the resultant solution, reviving the said solution after it has leached the said ore by treatment of the elements in the solution, and producing the desired metal and then leaching another charge of the ore with the resultant solution.

5. A process of extracting metallic copper from the ore, which consists in electrolyzing a solution of sodium chlorid in contact with soluble metallic anodes which will form a solvent for acting on the ore, forming a solution of chlorid of the said anode metal and converting the said chlorid to the chlorid of a higher order and at the same time forming another chlorin agent in the solution, leaching one charge of the ore with the resultant solution, reviving the solution from the leached ore by treatment of the elements in the solution and producing metallic copper, and leaching another charge of the ore with the resultant solution.

6. A process of treating ore which consists in decomposing a solution of sodium chlorid in contact with a soluble metallic anode which will form a solvent for acting on the ore, transferring the chlorin from one part of the solution to another, leaching the ore with the portion containing the chlorin, reviving the said solution by treatment of the elements in the solution and leaching a second quantity of the said ore.

7. A process of extracting metal from ore, which consists in electrolyzing a solution of sodium chlorid in contact with a soluble metallic anode which will form a solvent for acting on the ore, electrolyzing the solution formed in the last mentioned step in contact with an insoluble anode, leaching the ore with the solution formed in the last mentioned step, reviving the solution formed in the last mentioned step by treatment of the elements in the solution and producing the metal at the same time from the said solution while it is being revived.

8. A process of extracting copper from its ore, which consists in electrolyzing a solution of sodium chlorid in contact with a soluble metallic anode which will form in the solution a solvent of the copper compounds of the ore, dissolving the metal from the anode in the solution and forming a solution of a lower chlorid of the metal of the anode, converting said lower chlorid into a solution of a chlorid of a higher order, leaching the ore, electrolytically producing the copper and at the same time reviving the solution by treatment of the elements in the solution with an active chlorin agent and again treating ore with the revived solution.

9. The process of extracting copper from its ores, which consists in electrolyzing the solution of sodium chlorid in contact with an iron anode, collecting the solution formed about the anode and again electrolyzing the said solution formed about the said anode in contact with an insoluble anode, leaching the ore with the solution formed about the insoluble anode, electrolyzing a portion of the solution formed in the lixiviation, precipitating the copper and collecting it in a second portion of the said solution and at the same time recharging the first mentioned portion with the active agents found in the leaching solution and again leaching a second charge of the ore.

10. A process of extracting a metal from ore, which consists in electrolyzing a solution of sodium chlorid in the presence of a metal which will form a solvent for acting on the ore, and again electrolyzing the solution thus formed in contact with an insoluble electrode, leaching the ore with the solution thus formed, electrolyzing the solution produced after leaching, precipitating the desired metal into a part of the solution formed after leaching the ore, and restoring to another portion of the solution formed after leaching of the ore the chlorin released from the desired metal.

11. A process of treating ore, which consists in leaching a charge of the ore with a solution containing a metallic chlorid and free hydrochloric acid and reviving the resultant solution produced after leaching the ore by treatment of the elements in the solution and leaching another charge of the ore with the revived solution.

12. A process of extracting metal from its ores having two or more metals, which consists in electrolyzing NaCl in solution and forming hydrogen and chlorin which are permitted to unite in part to form hydrochloric acid and treating the ore with the solution thus formed and electrolyzing the resultant solution and again forming HCl and a higher chlorid of one of the metals in said solution and again leaching another charge of the ore with the solution containing the HCl and the higher chlorid formed in the last mentioned step.

13. A process of treating ore having two or more metals, which consists in leaching a charge of the ore with a solution containing chlorids of one or more of the metals of the ore and changing the chlorid of a metal of the ore other than the desired metal to a chlorid of that metal of a higher order and leaching another charge of the ore with the solution thus formed.

14. The process of extracting copper from its ore, which consists in making a solution of the chlorids of the metals contained in the ore and electrolytically precipitating the copper and charging the chlorids of the other metals with the chlorin from the metal precipitated.

15. The process of extracting metal from ore having two or more metals, which consists in forming the chlorids of the metals of the ore other than the desired metal and electrolyzing the solution, precipitating the desired metal and changing the chlorid compound of the said other metal of the ore thus formed from the ore to a chlorid of a higher order and treating another charge of the ore with a solution of the said chlorid of higher order.

16. A process of extracting metal from ore, which consists in treating the ore with an active agent in solution, precipitating the desired metal into a non-active fluid and restoring to the solution formed after the treatment, the active agent released in precipitating the said metal.

17. A process of extracting metal from ore, which consists in leaching the ore with an active agent in a solution, precipitating the desired metal into a portion of the solution formed after leaching, and reviving the remainder of the said solution formed after leaching by treatment of the elements in the solution.

18. A process of extracting copper from ore, which consists in leaching the ore with an active chlorin agent in a solution, precipitating the copper into a portion of the solution formed after leaching, and restoring the chlorin combined with the copper after leaching to the remainder of the said solution from which the said copper is precipitated.

19. The process of extracting copper from its ores, which consists in leaching the ore with a solution containing active chlorin agents, electrolyzing a portion of the solution formed in the lixiviation, precipitating the copper and collecting it in a second portion of the solution and at the same time reviving the first mentioned portion with active chlorin agents by treatment of the elements in the solution and again leaching the second charge of the ore with the solution thus formed.

20. The process of reducing copper from its ores, which consists in leaching the ore with a solution of a chlorid of a metal of a higher order, electrolyzing a portion of the solution formed in the lixiviation, precipitating the copper and collecting it in a second portion of the solution and at the same time recharging the first named portion with a chlorid of a metal of higher order, chlorin and hydrochloric acid and again leaching the second charge of the ore with the last mentioned solution.

21. The process of treating copper ores having iron, which consists in forming the chlorids of the metals with a chlorin agent, decomposing the chlorid of copper from a portion of the solution thus formed and precipitating the copper into another portion of the solution thus formed and at the same time forming chlorid compounds of the iron in the first portion of the solution and treating another charge of the ore.

22. A process of extracting metal from ore, which consists in electrolyzing a solution of sodium chlorid in the presence of a metal which will form a solvent for acting on the ore, leaching the ore in the said solution by treatment of the elements in the solution and electrolyzing the solution formed after leaching, and precipitating the metal into a portion of the said solution formed after leaching.

23. A process of extracting a metal from its ore, which consists in leaching the ore with a solution having active agents and reviving the compounds formed by the action of the said active agents on the metals contained in the ore by treatment of the elements in the solution and at the same time precipitating the desired metal into a part of the solution unrevived and leaching another charge of the ore.

24. A process of extracting metal from ore having two or more metals by leaching the ore with a solution of an active agent, which metals other than the desired metal will constitute a medium for the retention of the said active agent and charging the said medium with the active agent combined with the desired metal in the leaching step and leaching another charge of the ore with the resultant solution, thereby obtaining an additional amount of the metal other than the desired metal for the retention of the active agent until the compound of the said solution becomes concentrated to a more or less degree with the said other metals.

In testimony whereof, I have signed my name to this specification, in the presence of two subscribing witnesses.

HENRY S. MacKAY.

Witnesses:
F. F. CRAMPTON,
M. A. BUTLER.